United States Patent
Adler et al.

(10) Patent No.: US 9,234,543 B2
(45) Date of Patent: Jan. 12, 2016

(54) GUIDE ARRANGEMENT AND MACHINE TOOL COMPRISING SUCH A GUIDE ARRANGEMENT

(75) Inventors: Kai Adler, Ludwigsburg (DE); Sabrina Gressler, Bietigheim-Bissingen (DE); Martin Ernst, Darmstad (DE); Dietmar Kohler, Illingen (DE)

(73) Assignee: GLEASON-PFAUTER MASCHINENFABRIK GMBH, Ludwigsburg (DE)

( * ) Notice: Subject to any disclaimer, the term of this patent is extended or adjusted under 35 U.S.C. 154(b) by 0 days.

(21) Appl. No.: 13/880,104

(22) PCT Filed: Aug. 22, 2011

(86) PCT No.: PCT/EP2011/004215
§ 371 (c)(1),
(2), (4) Date: Apr. 18, 2013

(87) PCT Pub. No.: WO2012/052082
PCT Pub. Date: Apr. 26, 2012

(65) Prior Publication Data
US 2013/0216165 A1 Aug. 22, 2013

(30) Foreign Application Priority Data
Oct. 22, 2010 (DE) .......................... 10 2010 049 319

(51) Int. Cl.
*F16C 31/00* (2006.01)
*F16C 29/00* (2006.01)
*B23Q 1/01* (2006.01)
*B23Q 1/38* (2006.01)
*B23Q 1/40* (2006.01)
(Continued)

(52) U.S. Cl.
CPC .............. *F16C 29/008* (2013.01); *B23Q 1/017* (2013.01); *B23Q 1/38* (2013.01); *B23Q 1/40* (2013.01); *F16C 29/007* (2013.01)

(58) Field of Classification Search
CPC ............ B23Q 1/017; B23Q 1/38; B23Q 1/40; F16C 29/007; F16C 29/008
USPC ...................... 384/7, 9, 25, 43, 45, 50, 53, 55; 108/143; 74/490.08, 490.09
See application file for complete search history.

(56) References Cited

U.S. PATENT DOCUMENTS 7,062,985 B2 * 6/2006 Bauer .............................. 384/42
7,635,223 B2 * 12/2009 Koeniger et al. ............... 384/45

FOREIGN PATENT DOCUMENTS

| DE | 3429692 A1 | 2/1986 |
| DE | 3435593 A1 | 4/1986 |
| DE | 19500786 A1 | 7/1996 |
| EP | 0927599 A1 | 7/1999 |
| EP | 1630434 A2 | 3/2006 |
| JP | 9-131634 A | 5/1997 |

OTHER PUBLICATIONS

International Search Report and Written Opinion for PCT/EP2011/004215.
Patent Abstracts of Japan, Publication No. JP 09-131634 (May 20, 1997), Okuma Machine Works Ltd.

* cited by examiner

*Primary Examiner* — James Pilkington
(74) *Attorney, Agent, or Firm* — Robert L. McDowell

(57) ABSTRACT

Guide arrangement serving to guide a linear movement of a movable part (2) extending opposite a stationary part (1) along the movement axis and along a transverse direction oriented at a right angle to the movement axis, wherein the guide arrangement includes a support area belonging to the stationary part on which the movable part is slidingly supported and a roller guide arrangement (12) with a roller-guiding area belonging to the stationary part.

11 Claims, 4 Drawing Sheets

GUIDE ARRANGEMENT AND MACHINE TOOL COMPRISING SUCH A GUIDE ARRANGEMENT

FIELD OF THE INVENTION

The invention concerns a guide arrangement, specifically a guide arrangement of a machine tool, wherein the guide arrangement serves to guide a linear movement of a movable part extending opposite a stationary part along the movement axis and along a transverse direction oriented at a right angle to the movement axis, said guide arrangement comprising a support area belonging to the stationary part, on which support area the movable part is slidingly supported against a holding force that acts in a normal direction orthogonal to the directions in which the movable part extends, and further comprising a roller guide arrangement having a roller-guiding area belonging to the stationary part, wherein a load originating from the movable part, having a load component oriented in the opposite direction of the holding force and acting on the roller-guiding area causes within the stationary part a loading effect along a path of load propagation leading to the supporting area. In addition, the invention also concerns a machine tool equipped with a guide arrangement according to the foregoing description.

BACKGROUND OF THE INVENTION

Guide arrangements of this kind belong to the known state of the art and are described for example in DE 34 35 593 A1 or in DE 34 29 692. Thus, according to the description in DE 34 39 692, a machine table extends in a horizontal plane above a machine bed and is held on the machine bed by, among other factors, the weight force of the machine table. A movement of the machine table against the direction of gravity is constrained inasmuch as the table at its lateral ends embraces projections in the form of guide rails that protrude in the transverse direction from the machine bed. In this way, with the use of roller guides, the machine table is reliably restrained in the vertical direction. DE 34 35 593 A1 teaches the concept to provide on both transversely opposite sides of a carriage part a roller guide which rolls in an undercut of a base part and is arranged for this purpose in a suitable reach-around portion of the carriage part together with an adjuster element allowing a play-free adjustment setting of the roller guide.

In a similar arrangement, which is disclosed in DE 195 00 786 A1, a transverse carriage is restrained from moving vertically against the direction of the cutting force by means of a reach-around portion of the transverse carriage embracing a transversely protruding guide flange of a longitudinal carriage, albeit not as a roller guide but as a sliding guide.

The foregoing state-of-the-art guide arrangements have not proven themselves to be totally satisfactory, particularly in regard to their rigidity under high loads. The present invention therefore has the objective to provide improvements, particularly in regard to rigidity, in a guide arrangement of the kind delineated in the introductory paragraph.

SUMMARY OF THE INVENTION

This task is solved by the invention through a further development of such a guide arrangement, which is essentially characterized by the feature that the load propagation path includes a path section with a component directed against the load component in the normal direction.

In the process of making the invention, it was recognized that a solution where the movable part is secured against loads in the normal direction (i.e. restrained from lifting off) with the state-of-the-art concept of guiding constraints reaching behind the support surface causes the lateral rigidity of the sliding guide path associated with this support surface to be compromised. This is a result of the configuration where the portion of the stationary part that forms the supporting area juts out relative to the contours of the adjacent portion, whereby a weakened area is created in the material. The load introduced into the roller-guiding area affects the material of the stationary part between the roller area and the support surface through stationary internal stresses or also, if machining forces are present, through dynamic forces. In state-of-the-art solutions, the load component also acts along this load propagation path against the direction of the normal vector, so that the support surface area is receiving a compressive load.

In contrast, with an arrangement according to the invention, the load acting inside the stationary part, on its propagation path from the roller-guiding area to the support surface area, is oriented against the path direction at least in that segment of the path, so that a tensile force is present at least in this path section. In this manner, the load can be introduced into the roller-guiding area in a practical way without the need for a restraint that reaches around and behind the support area.

In other words, a domain in which a force occurs as a result of an external load caused for example by a tilting moment of a milling head attached to the movable part or by a machining force during operation of the machine tool is relocated from the movable part to the stationary part. In addition, the inventive solution opens up a field for new design concepts of a combined roller- and slideway guide which offer further advantages in regard to the avoidance of jamming forces that could compromise the linear guide function and/or in regard to simplifying the manufacture of the guide arrangement.

Next, however, some of the features mentioned above remain to be explained further. Thus the references to "stationary" and "movable" parts refer only to the relative movement between two parts and are in no way meant as a restriction in the sense that the stationary part would have to be stationary within an absolute frame of reference. Rather, the stationary part itself can at the same time be movably supported in relation to a further part.

The arrangement of the movable part relative to the stationary is such that the side of the movable part that faces towards the stationary part extends along the latter. The main directions in which it extends are referred to as the lengthwise direction oriented along the axis of movement and the transverse direction orthogonal to the axis of movement. Independent of the orientation of the surfaces of the roller-guiding area and/or the support area, these directions define the overall orientation of the guided support arrangement of the movable part relative to the stationary part. With preference, the thus defined spatial range lies in a plane. The roller-guiding area is in rolling engagement with a complementary component of the movable part by way of roller elements.

The slideway formed by the sliding support of the movable part on the support surface area of the stationary part is preferably active under any load condition of the guide arrangement. This is assured by a holding force which acts in the normal direction towards the supporting base, i.e. perpendicular to the principal directions in which the movable part (and also the stationary part) extends, and which is counteracted by a supporting force. Accordingly the normal direction in the example of a movable part supported on a horizontal plane is identical with the direction of gravity. To the extent that the vector direction of the normal axis is of relevance in the following description, it is meant to point from the movable part towards the stationary part. The holding force thus represents the normal component of the forces acting on that portion of the movable part that rests against the supporting area of the stationary part. To maintain the sliding guide contact, the holding force should be positive, i.e. directed towards the supporting area. Otherwise, the guide arrangement will lose the intended stiffness of the sliding constraint which contributes to a high overall stiffness of the guide arrangement and constitutes the main portion of the overall stiffness of the guide arrangement.

Depending on specifically where on the movable part the supported area is located that is complementary to the supporting area and depending on how the movement axis and the transverse direction are arranged, the resultant holding forces will turn out to be different, wherein the weight force or the moments associated with the latter can either make a positive contribution or reduce the holding force.

Accordingly, such gravity-related influences, besides working loads occurring for example during operation of a machine tool that is equipped with the guide arrangement, can also represent loads that are statically or dynamically taken up by the roller guide arrangement, i.e. on the side of the stationary part by the roller-guiding area. The counterforce provided by the roller guide assures on the one hand that the movable part can continue to perform the linear movement and is not deflected from the latter in the normal direction. On the other hand, this counterforce can also further enhance the stiffness of the guide arrangement and, if it is set at an appropriate magnitude, it can ensure that the sliding contact of the slideway guide is maintained.

In a particularly preferred embodiment of the invention, the load acting on the roller-guiding area is oriented away from a plane that extends orthogonal to the normal direction of the support area. In other words, the load in the positive normal direction can be introduced into the stationary part at a location above the support area and, as a technical advantage, the movable part does therefore not have to reach as far downward as in the prior art. This aspect of the invention is disclosed and considered an advantageous feature independent of the trajectory of the load propagation path.

In case that the support area also occupies a spatial range orthogonal to the plane over which the movable part extends, the load acting on the roller-guiding area should preferably be directed away from that plane through the support area and orthogonal to its normal direction which lies most distant from the movable part, and it should also in particular be directed away from the surface through the support area and orthogonal to its normal direction which lies closest to the movable part. Under this point of view, it is considered advisable that the roller-guiding area be located closer to the movable part than the support area.

With particular preference, the roller-guiding area is also designed to take up forces in the transverse direction. Especially transverse forces that occur during operation of a machine tool can be counteracted in particular through a pre-tensioning fore in the roller guide arrangement and will thus not introduce a load for example into a spindle drive that is used to control the movable part. Under the same aspect, the roller-guiding area advantageously has a roller contact surface that is inclined relative to the normal direction at an angle of 30° to 60°, preferably 40° to 50°. However, it is also possible to use curved roller contact surfaces whose tangent is inclined within this angular range relative to the normal direction at least over part of the surface.

Preferably, a support area and a roller-guiding area are associated with a side of the stationary part, wherein the term "side" refers to a lateral position relative to the transverse direction, and the two areas are offset from each other in the transverse direction. In other words, in a viewing plane that runs orthogonal to the axis of movement the two areas belonging to the same side are located laterally of each other. This aspect is considered as an advantageous feature within the scope of the invention independent of a trajectory field of internal load propagation paths in which the acting load gives rise to stress loads within the stationary part and is disclosed herewith explicitly as being realizable independently of said internal load propagation paths. With this arrangement, a kind of leverage is realized that is particularly advantageous in taking up loads acting in the transverse direction, so that the loads that are present will lead to a lower stress load on the guide arrangement. Under the same aspect, it is advantageous to arrange the roller-guiding area farther to the outside (relative to the transverse direction) than the support area, in particular farther to the outside than any slide-contact support area on the same side as said roller-guiding area. This again improves the leverage situation in the taking up of the load. Also in this connection, it is envisioned to be practical if the support area and the roller-guiding area are spaced apart in the transverse direction at a distance that is in particular at least half as large as the transverse dimension of the roller-guiding area itself.

In a preferred arrangement, a roller guide rail carries on both sides (seen in the transverse direction) a roller-guiding area that is in a rolling contact engagement with a conforming counterpart, wherein one of the roller-guiding areas can take up a transverse load in one transverse direction and the other contact area taking up a load in the opposite direction.

In a particularly preferred embodiment, the support area includes and, in particular, consists of a support surface that extends parallel to the transverse direction. This proves to be technically advantageous in the manufacturing process as it allows the slideway and the roller guide to be parallel-aligned together, a process that demands extreme precision in order to avoid the occurrence of jamming forces.

In order to assure a sufficiently high degree of intrinsic stiffness of the slideway guide arrangement, the transverse dimension of the support area is preferably selected at least three times as large, but preferably four times as large, and in particular at least five times as large as the transverse dimension of the roller-guiding area.

In a practical application of the guide arrangement, the scalar product of the normal vector and the gravity vector should be greater than or equal to zero. This gives assurance that the weight force acting on the movable part or parts attached to the latter can represent a force that opposes the holding force by way of the moments arising from it, but not as a direct-acting force.

Particularly preferred embodiments relate to applications in which the normal direction is oriented orthogonal to the direction of gravity, i.e. applications with a vertical movement axis, as well as applications in which the normal direction is oriented parallel to the direction of gravity, i.e. applications with a horizontal movement axis. This allows the inventive concept to be used for horizontal and vertical carriage arrangements.

As already explained above, particularly in applications with a vertical movement axis, a required amount of holding force in all sections of the sliding guide can no longer be achieved through weight forces, or through moments resulting from weight forces. A solution is therefore preferred where the guide arrangement is held under a pre-tensioning force which contributes to the holding force and which is applied by way of the roller guide arrangement. The contribution of the pre-tensioning force may in some cases have to be sufficiently large in local areas of the roller guide in order to counteract for example a moment caused by a carriage arrangement weighing 3.5 tons, including the milling head. To accomplish this, individual sections of the roller guide arrangement can be pre-tensioned independently of each other by a suitable adaptation of the roller track (roller guide rail) and the roller carriages (roller guide shoes) containing the roller elements, for example roller balls.

For a basic variability or for the fine adjustment of the individual sections of the roller guide arrangement and adjacent slideway sections, a solution is preferred where the pre-tension can be set to a selectable amount of tightness. Specifically, it is intended to use shim plates which connect the roller guide arrangement to the stationary and/or to the movable part, wherein shim plates of a suitable thickness are inserted between the parts to be connected. The pre-tension can then be modified through a fine adjustment of the plates, for example by surface grinding. The adjustment by way of the shim plates also affects the stress conditions in the roller guide arrangement. Consequently, in the process of modifying the stress in the roller guide arrangement, care should be taken that an allowable tolerance that is critical for the reliable functioning of the roller guide is not exceeded. The shim plates can be designed so that they can be uninstalled and replaced. A locally different amount of adjustment of the pre-tension can thus be selected. As a further possibility to modify the pre-tension and thus the holding force, pressure could be applied by hydraulic means in the area of the slideway, however only for a modification that lowers the holding force in order to reduce the sliding friction forces.

In an advantageous embodiment, a carrier forms the support area (which can include a slide surface coating that is overlaid on the material of the carrier). This means that the support surface is essentially associated with the moving part as a lateral area of the carrier. Preferably also arranged on this (same) carrier is a roller guide rail which forms the roller-guiding area, wherein a roller carriage (roller guide shoe) conforming to the rail and forming a part of the roller guide arrangement is mounted on the movable part in particular by way of the aforementioned shim plate. It is further advantageous to mount the roller guide rail at the same height of the carrier as the support surface which facilitates attaining the required parallelism of the roller guide arrangement and the sliding guide path in the manufacturing and fine-adjusting process. In this manner, undesirable jamming forces can largely be avoided, and in the manufacturing process, only a single surface for the roller- and sliding guide arrangement has to be precisely finished.

In case the two guide arrangements still show a residual deviation from perfect parallelism, this can be compensated through the means by which the guide shoes that engage the roller guide rail are mounted on a counteracting support. The intended solution is to provide the counteracting support with a given amount of flexibility in the opposite direction of the supporting force. This is preferably realized by appropriately adjusting a material strength of the counteracting support in the normal direction, in particular by reducing the material strength of the counteracting support in relation to the strength of material portion of the movable part which, in the main plane of the arrangement, surrounds the counteracting support. The counteracting support is now configured as a lateral flange in relation to the main body of the movable part. In particular, the profile of that surface of the movable part which faces away from the stationary part includes a step in the transverse direction at the transition to the counteracting support of the roller guide shoes.

With special preference, the guide arrangement includes on both sides (relative to the transverse direction) a roller guide- and sliding guide arrangement. The guide arrangement can be designed in particular with axial symmetry relative to a centerline axis that runs parallel to the movement axis. In this way, a reliable guide arrangement with a sufficient intrinsic stiffness can be ensured even if the movable parts are relatively large. Thus the two pairs of roller- and sliding guides extend in parallel on both sides of the drive source of the movable part.

In an advantageous embodiment, a portion of the movable part that is in rolling engagement with the roller-guiding area and a portion of the movable part that is slidingly supported on the support area are subdivided into sections that are arranged at separate intervals along the movement axis. In this manner, a sufficient soundness of the guiding arrangement can be assured while friction losses are reduced, as there is neither rolling nor sliding guide contact in some sections along the movement axis. With preference, this concept is realized with at least two sections on either side, wherein the portions belonging to the roller guide arrangement in each section can be realized in the form of one or more roller guide shoes. The length of the contact support area and of the roller engagement area in the movement direction can be of the same order of magnitude, but it is also possible to choose different lengths depending on the anticipated load forces and holding reactions.

Besides the guide arrangement per se, the invention also covers a machine tool with the inventive guide arrangement having one or more of the features described above. It is envisioned in particular to guide a first carriage in the form of e.g. a main column on a stationary machine bed by means of a first guide arrangement according to the invention, and to guide a second carriage, in particular a vertical carriage, on the first carriage by means of a second guide arrangement according to the invention. In addition, an opposing column which is mounted in a fixed position on the machine bed can carry a vertical carriage that is guided analogously by a third guide arrangement according to the invention.

Further details, features and advantageous of the invention will become apparent from the following description which refers to the attached drawings, wherein

DETAILED DESCRIPTION OF THE PREFERRED EMBODIMENT

Figure 1:
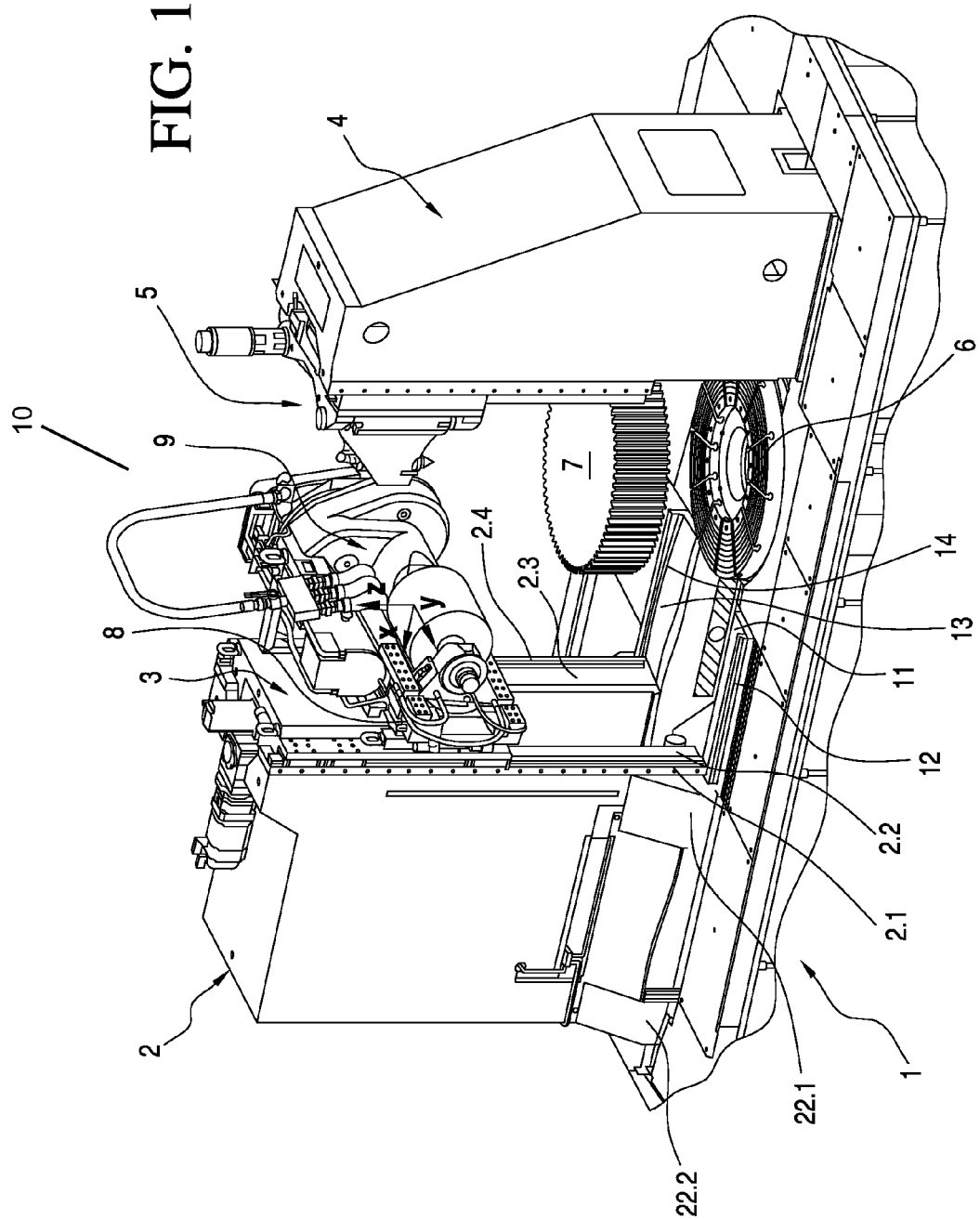
FIG. 1 gives a perspective view of a machine tool.

FIG. 1 represents a machine tool 10 wherein the guide arrangement according to the invention is employed in several instances. The machine tool 10 is designed for the machining of gear teeth and can produce the latter for example by hob milling or profile milling and can also perform hard-finishing operations on gear teeth.

The machine tool 10 has a machine bed 1, shown only partially with portions cut away, which is supported on the floor and which, on the side facing away from the floor, carries two slideways 11, 13 arranged parallel to each other in the radial direction (x-direction), on which a slidingly supported main column 2 is movable in the radial direction relative to the machine bed 1. This movement is actuated in the conventional manner by a drive system which is arranged in the space between the slideways 11, 13, consisting for example of a servo motor, a radial/axial bearing and a ball spindle. Each of the slideways 11, 13 is part of a respective sliding guide for the main column 2. Due to the inherently high rigidity of the sliding guides, a high overall rigidity of the linear guiding arrangement of the main column 2 is achieved. In addition, the friction force occurring in the sliding guide as a result of the normal force acting on the slideways 11, 13 due to the weight of the main column 2 causes a damping of the drive system. Even under strongly fluctuating machining work forces acting on the main column 2, the occurrence of uncontrolled oscillations in the system can be counteracted.

In the guide arrangement according to the invention, a roller guide rail 12 is arranged between the machine bed 1 and the main column 2, running parallel to and behind the slideway 11, offset relative to the latter in the transverse direction y which extends orthogonal to the movement axis x, running at the height of the slideway 11, and secured in a fixed position relative to the transverse direction on the extension of the machine component 1.1 that forms the slideway 11. Arranged in relation to the transverse direction y on the opposite side of the main column 2 is a roller guide rail 14 running parallel to the slideway 13 (see FIG. 2), symmetrically analogous to the side that faces the viewer in FIG. 1. The roller guide rails 12, 14 are components of linear roller guides which reliably secure the main column 2 against lifting off from the slideways 11, 13 in case of static or dynamic tilting moments, as will be explained hereinafter in more detail in the context of FIG. 2, and which further secure the main column 2 relative to the transverse direction y.

Complementary to the roller guide rails 12, 14, roller guide shoes 22.1, 22.2 and 24.1, 24.2 are fastened, respectively, at the front and rear (relative to the x-axis) of each side of the main column 2 and are in rolling engagement with the roller guide rails 12, 14. In FIG. 1, only the rearward roller guide shoe 22.2 (relative to the movement direction x) is identified with a reference symbol. The roller guide shoe 22.1 is located at the forward end (see FIG. 2), while the roller guide shoes associated with the roller guide rail 14 are not visible in FIG. 1.

Before continuing with further details of the combined slide and roller guides, the other constituent parts of the machine tool 10 will now be explained. Arranged on the main column 2 with the freedom of vertical movement relative to the latter is a vertical carriage 3. The function of guiding the vertical carriage 3 on the main column 2 is likewise performed by a combined roller guide and slideway arrangement in the form of a slide surface (track) 2.3 and a roller guide rail 2.4 arranged parallel to each other on the right side (relative to the transverse direction y) and a corresponding track surface 2.2 and rail 2.1 on the left side. Otherwise, the arrangement of a sliding guide and a rolling guide is essentially analogous to the way in which the main column 2 is guided on the machine bed 1, with differences in design details to be covered later in the description of FIG. 4.

On the vertical carriage 3, in turn, an arrangement is rotatably supported which carries the milling head 9 and the tool spindle which serves to hold the working tools. In the position illustrated in FIG. 1, the tool spindle axis is oriented in the y-direction. Although the coordinate system drawn into FIG. 1 swivels together with the milling head when the latter is being rotated, for the purposes of this description the coordinate system is treated as a spatially fixed reference system.

A work piece to be machined, in this case a spur gear 7 is clamped in the conventional manner to a work piece table 6 which, in relation to the x-axis, is located between the main column 2 and an opposing column 4. The opposing column 4 itself is mounted in an immovable position relative to the machine bed and carries a further vertical carriage 5 tied to the opposing column 4 with guided mobility similar to the vertical carriage 3 by way of two combined roller- and sliding guides running parallel to each other.

Figure 2:
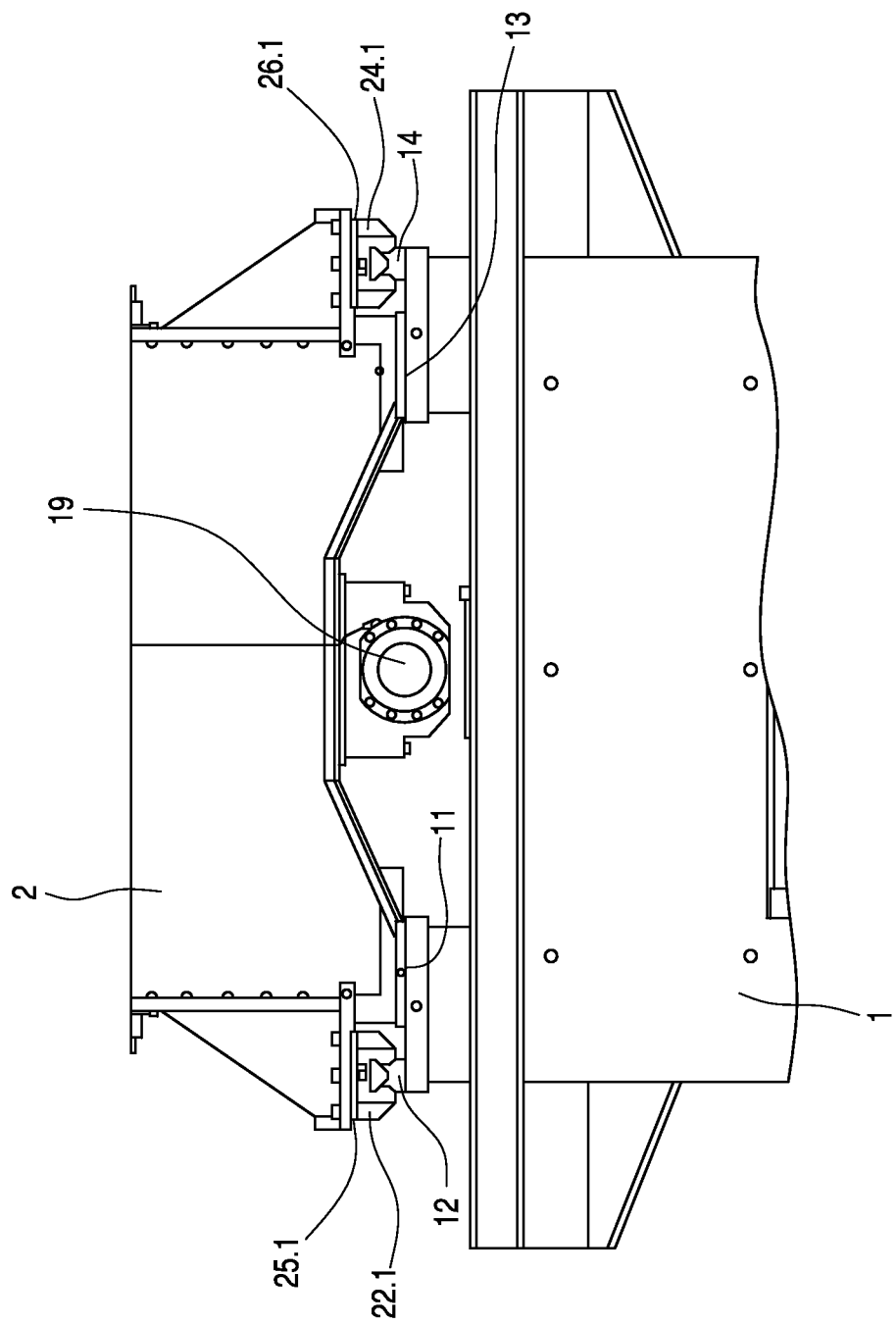
FIG. 2 shows a cross-sectional view of a lower portion of the machine tool.

FIG. 2 shows a sectional view in a plane through the roller guide shoes 22.1 and 24.1 (located on opposite sides) and orthogonal to the movement axis x of the main column 2. The drawing illustrates the spatially separated, parallel arrangement of the area 11 serving as slideway and the roller guide rail 12 which is embraced on both sides by the roller guide shoe 22.1 in order to counteract the load-related and tilting forces which would otherwise cause the main column 2 to lift off the slide surface 11.

Depending on the location of the overall center of gravity of the main column 2 and all of the parts supported by it, a holding force, in this case a positive force, is acting in the support area 11 on which the supported contact area 21.1 is slidingly supported. If in the process of machining the work piece 7, a machining force is generated which acts in the z-direction, it is taken up by the machining tool and ultimately introduced into the main column 2.

Figure 3:
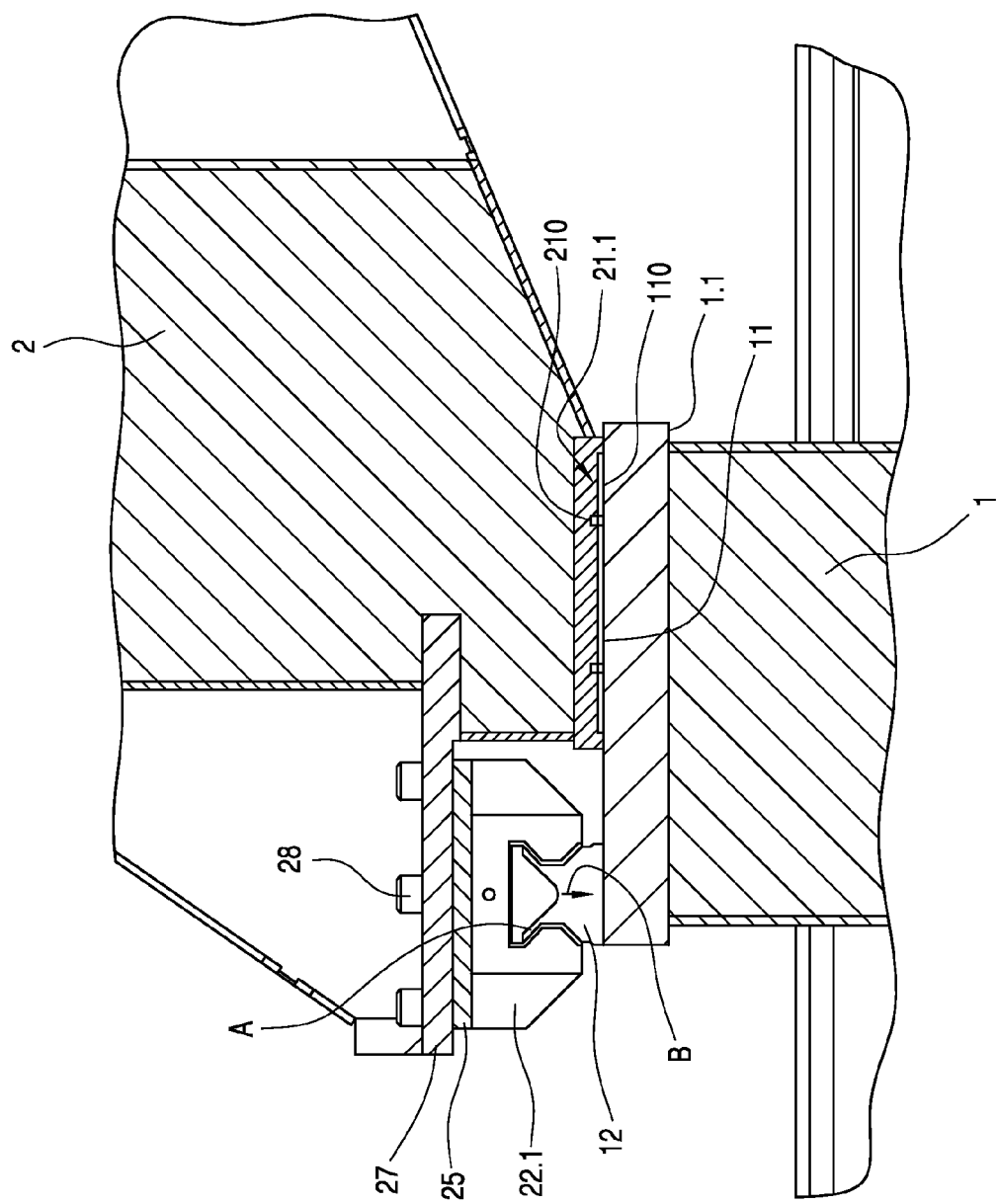
FIG. 3 represents an enlarged detail view of a portion of FIG. 2.

As a result, a tensile reaction force is generated in the main column 2, acting on the surface labeled A in FIG. 3, through which the force is introduced as a load with a positive z-component. As this load is introduced above the support area 11, it is now directed away from the latter. Propagating further in the direction towards the machine bed 1 and the support area 11 that is solidly connected to it, the load manifests itself in the area B (see FIG. 3) as a tensile force, i.e. oriented relative to the z-axis in the opposite direction of the force propagation. Thus, the load can be reliably taken up. At the same time, the support surface in its entire width (relative to the transverse direction y) is completely and massively grounded on the machine bed 1, and a sufficient lateral rigidity (resistance to sideways forces) of the sliding guide is assured.

An internal pre-tensioning force within the roller guide arrangement 22.1, 12 provides stiffness to the latter. In addition, by way of the mounting attachment of the roller guide carriages 22.1, 22.2, 24.1, 24.2 it is possible to generate an external pre-tensioning force which is superimposed on the internal pre-tensioning force and, depending on the location of the respective roller guide carriage and load expected in the respective area, can contribute to the force by which, for example in the illustrated case, the sliding support surface 21.1 of the main column which faces the slideway surface 11 (see FIG. 3) is pressed towards the latter. Expressed through a model using elastic springs, this could be interpreted as a shift in the zero position of the spring system. Furthermore, this also leads to an increase in the friction force generated in the sliding guide arrangement during movements. The sliding guide arrangement in this area thus consists of the two mutually opposed surfaces 11 and 21.1 extending in an x/y-plane as well as a slide surface coating 110, for example an SKC slideway coating 110, placed between the two surfaces. The forces acting on the slideway perpendicular to its lengthwise direction are thus constituted on the one hand by the forces arising from the weight and the weight distribution (center of gravity) of the main column and the additional carriages and tools that are coupled to the main column, but without the forces occurring in the machining of the work piece 7, and on the other hand by the forces acting as a result of the external pre-tensioning. A desired amount of external pre-tensioning can be set and, in addition, the pre-tensioning force of an individual portion of the roller guide arrangement (in FIG. 3 the portion 12, 22.1) can be modified, by the insertion of shim plates 25 between the roller guide shoe holder 27 and the roller guide shoe 22.1 which is attached to the holder 27 by way of screw bolts 28. To modify the pre-tensioning force, the shim plate 25, prior to its installation, is ground to a desired material thickness depending on the desired hold-down force in the slideway area 11, 110, 21.1.

The slideway surface 11 is the surface of a solid, single-piece plate 1.1 that faces towards the main column 2 and extends in x- and y-directions. The rail 12 is mounted on the plate 1.1 at the height of the slideway surface 11. This has the advantage that in the manufacturing and adjusting process of the guide arrangement, the slideway surface 11 and the mounting base of the roller guide rail are machined as a single surface to be precision-finished, so that the most accurate degree of parallelism is assured between the movement axes that are defined by these surfaces. Thus, the risk of jamming is minimized for the parts engaged with each other in the roller guide. Residual deviations from this parallelism are obviated by the fact that the supporting counterparts 27 of the roller guide shoes 22 are given a desired degree of flexibility towards a force directed away from the slideway surface 11. This is achieved by giving the supporting counterparts 27 the form of a flange of lesser material thickness, said flange being attached to the carriage (i.e. the main column or the vertical carriage).

In the supported contact area 21.1 which faces the slideway 11 and extends in the direction x of the movement axis over about the same length as the roller guide shoe 22.1, lubrication grooves 210 are formed in the slideway coating for the introduction of a lubricant. However, the supported contact areas can also extend somewhat beyond the length of the respectively adjacent roller guide shoe, or they could also have a shorter length in the direction of the movement axis, with the length being individually selectable in each section, whereby different degrees of stiffness can be set in the different locations. Between the slidingly supported contact area 21.1 and the analogous slidingly supported contact area 21.2 (not visible in the drawings) that is associated with the roller guide shoe 22.2 there is a clearance gap, created for example by shaving off surface material, between the main column and the slideway 11. In this area there is no sliding contact.

Figure 4:
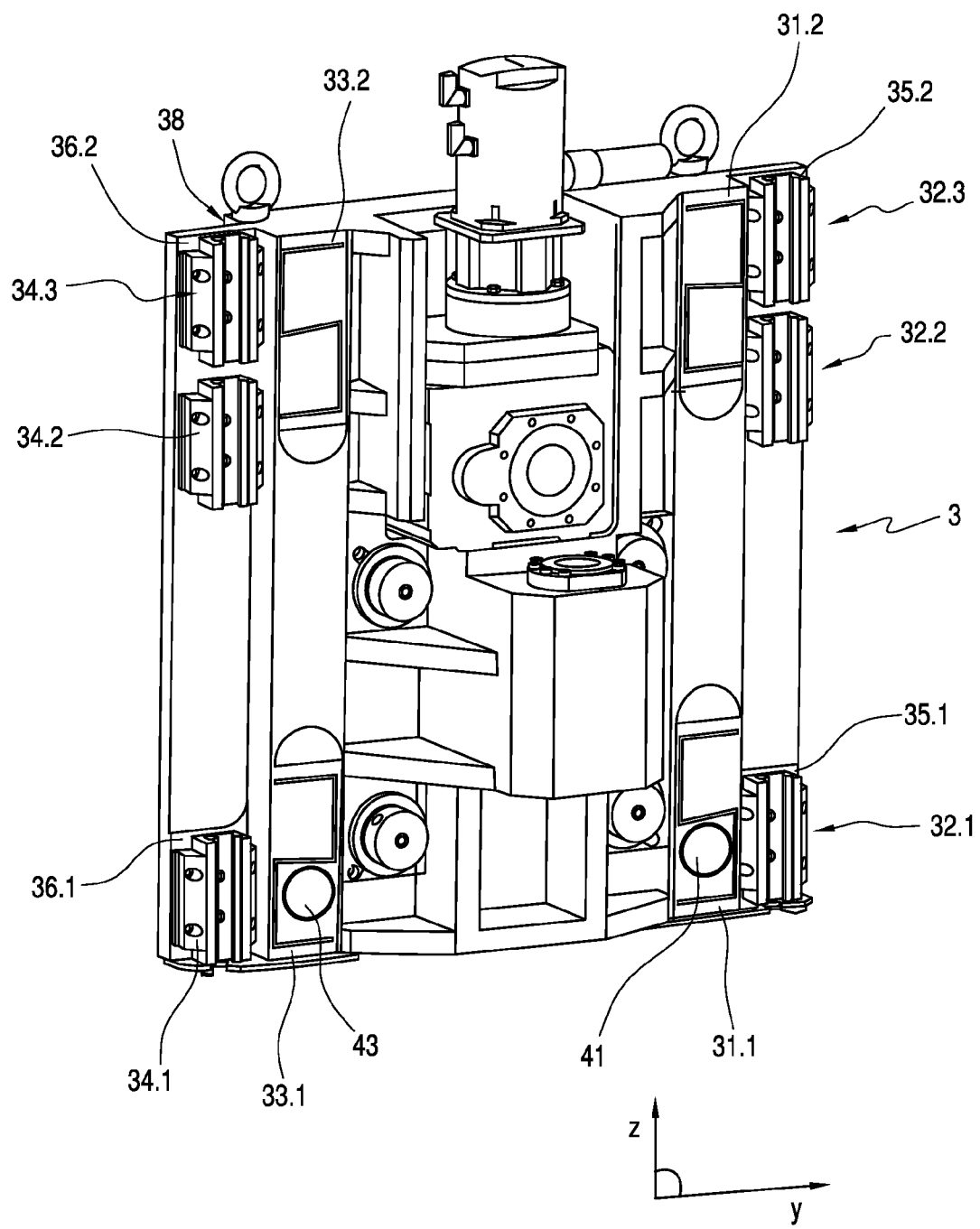
FIG. 4 represents a perspective view of the vertical carriage shown in FIG. 1.

FIG. 4 represents a magnified view of the side of the vertical carriage 3 that faces towards the main column 2. Accordingly, in relation to the main column 2 the vertical carriage 3 extends along its movement axis z and the transverse axis y, i.e. in the y/z-plane, regardless of the fact that individual portions of the vertical carriage 3 are standing out of the y/z-plane that contains for example the slidingly supported areas 31.1, 31.2, 33.1, 33.2.

On the side of the vertical carriage 3 (the movable part) the sliding guides 2.1, 31 and 2.3, 33 to both sides of the spindle drive are arranged parallel to each other and at the same height, and the respective parts of the sliding guide arrangement are constituted by the slidingly supported contact areas 31.1, 31.2, 33.1, 33.2. In the transverse direction y to the outside of these slidingly supported contact areas the roller guide shoes, constituting the portion of the roller guide arrangement associated with the movable part, are arranged parallel to the movement axis z. The roller guide shoes 34.1, 34.2 and 34.3 are in roller-contact engagement with the roller guide rail 2.4 shown in FIG. 1, while the slidingly supported surface areas 33.1 and 33.2 are in sliding contact engagement with the sliding support or slideway 2.3 shown in FIG. 1.

In between the roller guide shoes 34.1 and 34.2 as well as the supported contact areas 33.1 and 33.2 (relative to the direction of the movement axis z), no roller contact nor sliding contact takes place, so as to limit the friction losses while maintaining sufficient stability and rigidity of the guide arrangement. The same applies to the opposite side (relative to the transverse direction y) of the vertical carriage.

When the axial carriage including milling head, tool spindle and tool, which is rotatably arranged on the vertical carriage 3, is in the position illustrated in FIG. 1, the location of the center of gravity of the entire arrangement supported by the vertical carriage will be such that, without taking machining forces into account, a reactive constraint moment arises which generates a compressive force on the areas of the roller- and sliding guide shown in the lower part of FIG. 4 and thus contributes to the reactive constraint force, while acting as a tensile load relative to the upper parts of the roller- and sliding guide in FIG. 4, so that in this area the restraining force required to maintain the sliding guide contacts 2.3, 33.2 and 2.1, 31.1 has to be supplied through a pre-tensioning force. The latter is provided by the roller guides 2.4, 34.2, 34.3 and analogously on the opposite side 2.2, 32.2, 32.3, by virtue of their internal pre-tensioning force that is modified with the external pre-tensioning force.

Accordingly, the load acting on the machine tool 10 in the absence of machining forces is greatest in this upper area 2.4, 34.2, 34.3. For this reason, the amount of pre-tensioning force that is set in the upper section of the roller guide arrangement is greater than in the lower section and is applied by way of two roller guide shoes 34.2 and 34.3 that are arranged in line with each other, and analogously on the opposite side by way of the roller guide shoes 32.2 and 32.3. According to the invention it is envisioned for the roller guide engagement area to be preferably at least 30 percent longer in the section where the larger loads are transmitted, even better at least 60 percent and in particular at least 100 percent longer than the length of the roller guide arrangement in the section exposed to smaller loads, with the longer engagement area being realized for example with a greater number of roller guide shoes (roller carriages). Alternatively and/or additionally, the effective lever arm of the overall center of gravity of the movable part with the arrangement supported by it, i.e. the distance from the force-transmitting area of the roller guide shoe, can be increased. Selecting a higher amount of internal pre-tension, due to an associated increase in stiffness, leads to a higher stress load on the parts that meet each other in the roller guide arrangement, and therefore to a commensurately higher level of wear. Consequently, the possibility to select an amount of internal pre-tension for the roller guide arrangement in the section with the higher load that is 30 or more percent greater, preferably 60 or more percent greater, than the internal pre-tension in the section with the lower load, for example up to 30-60 percent, is a less preferred option.

The shim plates which have already been explained hereinabove are identified in FIG. 4 by the reference symbols 35.1, 35.2 as well as on the opposite side by 36.1 and 36.2. However, the shim plates 35.2 and 36.2 in the upper section could likewise be subdivided, so that each of the roller guide shoes in the upper section can be individually adjusted with its own shim plate. A further possibility to modify the pre-tensioning forces and thus the holding forces locally in the individual sections and independently of each other is to apply a hydraulic pressure through hydraulic fluid conduits terminating in the areas identified as 41 and 43. In the case of the vertical carriage 3, this feature is preferably realized in the lower supported contact areas, and in the case of the main column 2 in the supported contact areas closest to the work piece. FIG. 4 further shows steps 38 and 39 where the main body of the vertical carriage 3 is cut back by removing material from the supporting counterpart on the side that faces away from the roller guide shoes 32, 34. This removal of material is designed to achieve a desired amount of flexibility of the supporting counterpart of the roller guide shoe in the normal direction x, so as to offer less resistance to forces caused by imperfections in the parallelism of the roller guide and slideway arrangement and to thereby reliably avoid a jamming force that could compromise the guide function.

The invention is not limited to the features in the specific form in which they are presented in the foregoing description. Rather, the features of the invention disclosed in the foregoing description as well as in the claims can be relevant individually as well as collectively in any combination for realizing the invention in its different embodiments.

What is claimed is:

1. A gear manufacturing machine comprising a base and a column movable on said base along a movement axis extending in a first linear direction (X) via a guide arrangement, said base including a centerline extending parallel to said movement axis, said guide arrangement comprising:
   a support area on said base, said column being movable and slidingly supported on said support area,
   a roller guide arrangement comprising a roller guiding area located on said base, said roller guiding area being in engagement with a conforming counterpart on said column,
   wherein a transverse direction (Y) is defined on said base, said transverse direction extending perpendicular to said first linear direction,
   wherein relative to the transverse direction the support area and the roller-guiding area are located on at least one lateral side of said base and the two areas are offset from each other in the transverse direction, wherein the roller-guiding area is arranged, along the transverse direction, farther from said centerline than the support area.

2. The machine according to claim 1 wherein the roller-guiding area comprises a roller contact surface (A) that is inclined at an angle of 30° to 60° with respect to a direction normal to the first direction (X) and the transverse direction (Y).

3. The machine according to claim 1 wherein the support area comprises a support surface that extends parallel to the transverse direction.

4. The machine according to claim 1 wherein the transverse dimension of the support area is at least three times as large as the transverse dimension of the roller-guiding area.

5. The machine according to claim 1 wherein the guide arrangement is held under a pre-tensioning force which is applied by way of the roller guide arrangement.

6. The machine according to claim 5, wherein the pre-tensioning force is adjustable.

7. The machine according to claim 6, wherein the pre-tensioning force can be adjusted to a different magnitude at different locations.

8. The machine according to claim 6 wherein the adjustability of the pre-tensioning force is achieved by way of the material thickness of one or more shim plates through which the roller guide arrangement is connected to the base and/or to the column.

9. The machine according to claim 1 wherein the roller-guiding area is constituted by a roller guide rail wherein the roller guide rail is solidly mounted on a carrier that forms the support area and wherein further the roller guide rail is mounted on said carrier at the same height as the support area, wherein a roller guide shoe conforming to the roller guide rail and forming a part of the roller guide arrangement is mounted on the column by way of a shim plate.

10. The machine according to claim 9 further comprising a counteracting support of the roller guide shoe, said counteracting support being attached to said column.

11. The machine according to claim 1 wherein a portion of the column that is in rolling engagement with the roller-guiding area and a portion of the column that is slidingly supported on the support area are subdivided into sections that are arranged along the first linear direction and spaced apart from each other.

\* \* \* \* \*